United States Patent
Omori et al.

(12) 
(10) Patent No.: US 6,625,931 B2
(45) Date of Patent: Sep. 30, 2003

(54) GLASS RUN INCLUDING FINE LUBRICANT POWDER FOR REDUCING NOISE

(75) Inventors: Hitoshi Omori, Nishikasugai-gun (JP); Masanori Aritake, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/783,592

(22) Filed: Feb. 15, 2001

(65) Prior Publication Data

US 2001/0015034 A1 Aug. 23, 2001

(30) Foreign Application Priority Data

Feb. 18, 2000 (JP) ........................................ 2000-040814

(51) Int. Cl.⁷ .............................................. B60J 10/04
(52) U.S. Cl. ........................................ 49/440; 49/377
(58) Field of Search ........................... 49/440, 441, 377

(56) References Cited

U.S. PATENT DOCUMENTS 4,442,156 A * 4/1984 Yamaguchi ................. 428/142
4,542,610 A * 9/1985 Weimar ..................... 49/490.1
4,897,298 A * 1/1990 Otawa et al. ................ 428/122
4,993,775 A * 2/1991 Keys .......................... 296/201
5,306,537 A * 4/1994 Gustafson et al. .......... 428/141
5,343,655 A * 9/1994 Miyakawa et al. ........... 49/441
5,690,768 A   11/1997 Iwasa et al.
5,840,401 A * 11/1998 Baesecke .................... 428/122
6,099,676 A    8/2000 Hayashi
6,146,739 A * 11/2000 Itoh et al. ................... 428/122
6,245,409 B1 * 6/2001 Cook .......................... 428/122
6,412,226 B1 * 7/2002 Nozaki et al. ................ 49/377

* cited by examiner

Primary Examiner—Gregory J. Strimbu
(74) Attorney, Agent, or Firm—Posz & Bethards, PLC

(57) ABSTRACT

A glass run that is fitted inside the doorframe of a motor vehicle reduces noise due to the use of a fine lubricant powder. The powder prevents noise of inner lips of the glass run. which strike and separate from inner walls of the glass run. The fine powder, such as silicon powder, polyaminde resin powder, molybdenum disulfide powder and fatty acid amide powder, is contained in the main body of an EPDM rubber or TPO in a dispersed condition. Alternatively, foam rubber layers may be formed on the inside walls to reduce noise.

2 Claims, 3 Drawing Sheets

GLASS RUN INCLUDING FINE LUBRICANT POWDER FOR REDUCING NOISE

BACKGROUND OF THE INVENTION

1. Field of the Invention

The present invention relates to a glass run for attachment along a doorframe of a motor vehicle.

2. Description of Related Art

As shown in FIG. 1, a glass run 10 is continuously attached along an inner periphery of a doorframe 12 of a door 14 of a motor vehicle. As shown in FIG. 2, the glass run 10 includes a main body 18 having a generally U-shaped cross-section, and seal lips 20 and 22 extending inwardly from ends of facing side walls 24 and 26 of the main body 18. The glass run 10 thus arranged is fitted into a channel 28 formed inside the doorframe 12 such that the seal lips 20 and 22 contact the peripheral portion of the door glass 16 from both sides thereof. The glass run 10 is generally composed of rubber and, more specifically, ethylene propylene diene terpolymer rubber (EPDM rubber). Recently, thermoplastic olefin elastomer (TPO) has been also used as the material for the glass run 10.

Just after the door 14 is closed hard with the door glass 16 half opened, or when the motor vehicle runs on rough roads with the door glass 16 half opened, noises occur in the glass run 10. These noises are caused by the seal lips 20 and 22 repeatedly striking on facing side walls 24 and 26 with the vibration of the door glass 16.

Conventionally, it has been considered that these noises are mainly caused by the seal lips 20 and 22 being pushed by the door glass 16 to rub inside surfaces of the side walls 24 and 26. And, based on this consideration, films of a material exhibiting high lubricity, such as polyethylene or polypropylene, have been formed on the inside surfaces of the side walls 24 and 26 to decrease the sliding resistance between the side walls 24 and 26 and seal lips 20 and 22. This arrangement, however, cannot prevent such noises completely.

The present inventors have found that these noises do not occur when the seal lips rub the inside surfaces of the side walls of the glass run, but occur when the seal lips of rubber, which have been in close contact with the inside surfaces of the side walls of rubber, separate therefrom. Based on this finding, they have studied and succeeded in preventing occurrence of these noises by forming linear ridges in parallel with each other on the inside surfaces of the side walls in the longitudinal direction of the main body such that the seal lips come into approximately linear contact with the linear ridges, thereby reducing the contacting area of the seal lips with the side walls (Japanese patent application No. Hei 11-313771).

The present inventors have further conducted many experiments, and found that the reason for noises occurring in the glass run provided with such films of high lubricity is the hardness of such films. The hardness of the films of high lubricity is much greater than that of the glass run. Consequently, the seal lips which have been in close contact with such films instantly separate therefrom without any occurrence of noises. However, noises occur when the seal lips strike on these hard films.

SUMMARY OF THE INVENTION

It is an object of the present invention to provide a glass run capable of preventing occurrence of noises when a vehicle door is closed hard or a vehicle runs on rough roads with a door glass half opened.

More specifically, it is an object of the present invention to provide a glass run capable of preventing occurrence of such noises without modifying surfaces of a main body thereof, which are to contact seal lips, into a specific configuration, or without providing films composed of materials different from those of the main body on surfaces of the main body, which are to contact seal lips.

The glass run of the present invention is fitted inside a doorframe of a motor vehicle. The glass run of the present invention has a main body with a generally U-shaped cross section, and a pair of seal lips which extend obliquely inwardly from ends of side walls of the main body for holding the periphery of a door glass. At least the main body contains a fine powder of lubricant in a dispersed condition. At least one of silicon powder, polyamide resin powder, molybdenum disulfide powder and fatty acid amide powder is used as the lubricant. The preferred content of the lubricant ranges from 0.2 to 1.0% by weight of the material composing parts of the glass run, in which the lubricant is contained.

The hardness of the main body scarcely increases with the dispersion of fine lubricant powder, and the inside surfaces of the main body exhibit rubber-like elasticity, thereby preventing occurrence of noises when the seal lips strike on the main body. In addition, by virtue of the lubricant dispersed in the inside surfaces of the main body, separation of seal lips therefrom is facilitated without any occurrence of noises.

Alternatively, foamed layers composed of a material identical to that of the main body of the glass run may be formed on the inside surfaces of the main body, which face the seal lips. The foamed layers exhibit rubber-like elasticity, and the surfaces thereof have minute irregularities, and consequently, the contacting area of the seal lips with the surfaces of the foamed layers is small. This results in noises upon striking and separating of the seal lips on and from the main body being prevented.

Other objects, features, and characteristics of the present invention will become apparent upon consideration of the following description and the appended claims with reference to the accompanying drawings, all of which form a part of this specification.

BRIEF DESCRIPTION OF THE DRAWING

FIG. 3 (B) is a cross-sectional view illustrating the state where the seal lips are pressed by a door glass on inside surfaces of side walls.

DETAILED DESCRIPTION OF THE PRESENTLY PREFERRED EXEMPLARY EMBODIMENTS

Figure 1:
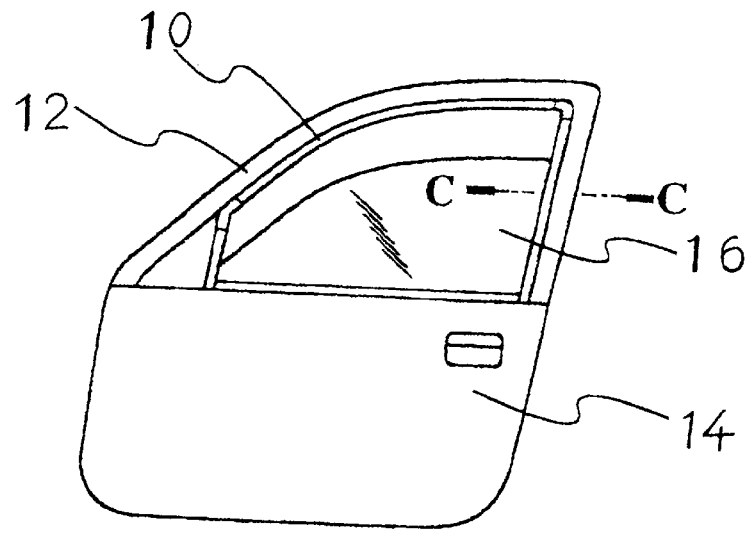
FIG. 1 is a front view of a door of a motor vehicle, to which a glass run is attached.
Figure 2:
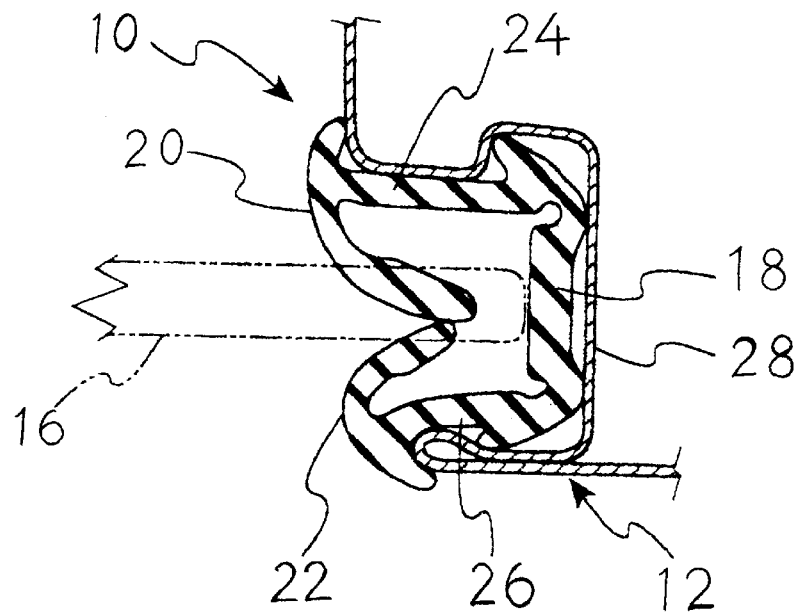
FIG. 2 is a cross-sectional view of a conventional glass run attached to the motor vehicle, which is taken along the line C—C of FIG. 1.
Figure 3:
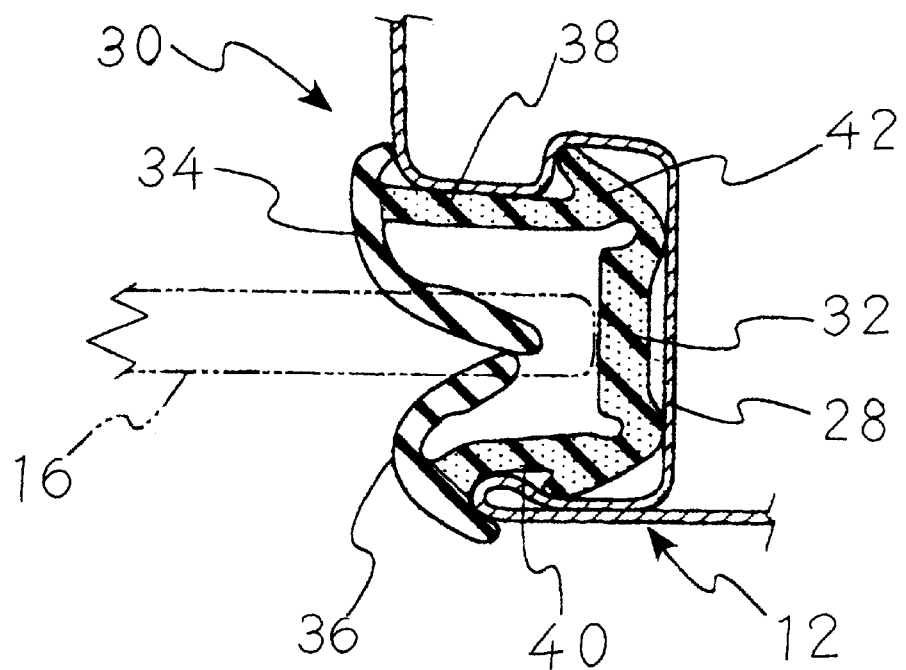
FIG. 3 (A) is a cross-sectional view of a glass run in accordance with the present invention, which is attached to the motor vehicle, taken along the line C—C of FIG. 1.
Figure 3:
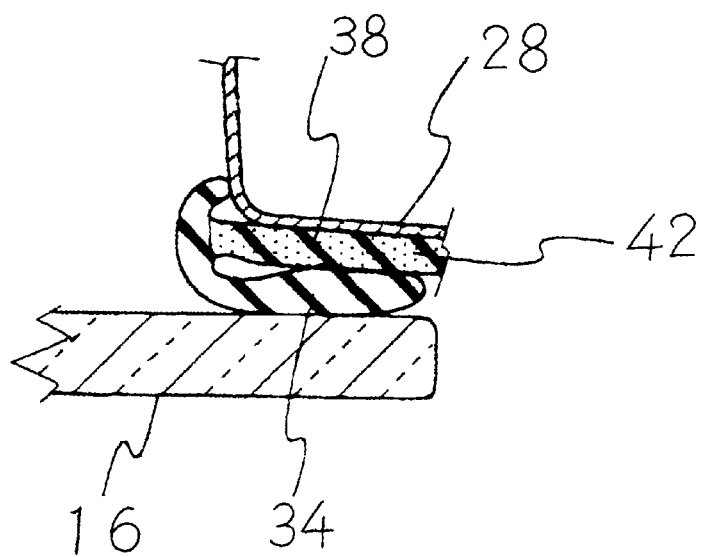

As shown in FIG. 3(A), a glass run 30 is composed of an extruded body of an EPDM rubber, and includes a main body 32 with a generally U-shaped cross-section, and seal lips 34 and 36 which extend obliquely inwardly from ends of side walls 38 and 40 of the main body 32 in facing directions. The glass run 30 thus arranged is fitted into a channel 28 having a generally U-shaped cross-section, whereby the seal lips 34 and 36 hold a periphery of a door glass 16 from both sides thereof.

The main body 32 of the glass run 30 contains a fine lubricant powder 42 in a dispersed condition. Silicon powder, polyamide resin powder, molybdenum disulfide powder and fatty acid amide powder are used as the lubricant powder. Plural kinds of these lubricant powders may be contained in the main body 32. The glass run 30 is produced by supplying an EPDM rubber for forming the main body 32, to which the fine lubricant powder is added in a homogeneously dispersed condition, and another EPDM rubber for forming the seal lips 34 and 36, to which no lubricant powder is added, to an extruder, thereby obtaining a glass run having the main body and seal lips integrally therewith from the extruder. In the main body 32 of the resultant glass run 30, the fine lubricant powder 42 is dispersed homogeneously. The composition ratio of the lubricant ranges from 0.2 to 1.0% by weight of the material for the main body.

FIG. 3(B) illustrates an interior of the glass run 30 of FIG. 3(A) at the time the door is closed hard with a door glass 16 half opened. The door glass 16 vibrates inwardly and outwardly of the vehicle body. When the door glass 16 vibrates inwardly of the vehicle body, the seal lip 34 strikes on the inside surface of the side wall 38 at high speed, and is pressed thereon. Then, the seal lip 34 separates from the side wall 38. These motions of the seal lip 34 are repeated for a while.

However, since the side wall 38 has a rubber-like elasticity, there does not occur any noise due to striking of the seal lip 34 on the side wall 38. In addition, since the fine lubricant powder 42 is dispersed in the inside surface of the side wall 38, the seal lip 34 which has been pressed on the side wall 38 can separate therefrom instantly without any occurrence of noises.

The preferred amount of the lubricant ranges from 0.2 to 1.0% by weight. In the case of less than 0.2% by weight, a sufficient noise preventing effect cannot be achieved when the seal lips separate from the side walls. In the case of more than 1.0% by weight, the lubricity of the surface of the main body 32 increases too much, and consequently slip occurs between the main body 32 and doorframe 12 in which the main body 32 is fitted, thereby lowering the stability in attaching the glass run 30.

Corner parts of the glass run, which are adapted to be attached along corners of the doorframe, are formed by connecting ends of extruded glass run members with molding.

In this case, when the content of the lubricant in the main body of each extruded glass run member exceeds 1.0% by weight, the joining strength between the extruded glass run member and molded corner parts decreases.

If a liquid lubricant is used, it gradually oozes from the inside surfaces of the main body with time. The oozed lubricant is removed from the inside surfaces with the repetition of striking of the seal lips thereon, and consequently, the inside surfaces lose its lubricity.

In the preceding description, the present invention has been explained with reference to the glass run composed of EPDM rubber. In the case the present invention is applied to the glass run composed of TPO, similar operational advantages can be obtained by adding an identical amount of silicon powder, polyamide resin powder, molybdenum disulfide powder and fatty acid amide powder to the material for the main body. Furthermore, seal lips may contain a fine lubricant powder, whether the main body is composed of EPDM rubber or TPO.

Figure 4:
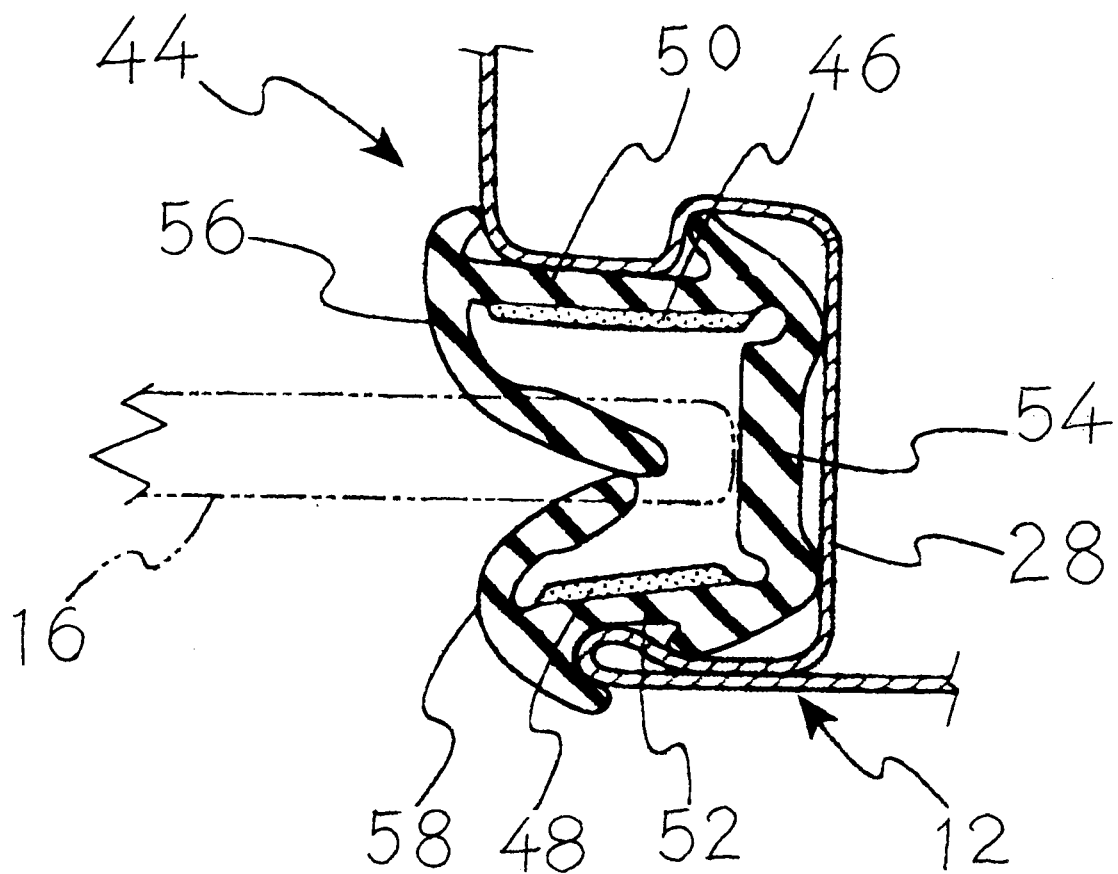
FIG. 4 is a cross-sectional view of another glass run in accordance with the present invention, which is attached to the motor vehicle, taken along the line C—C of FIG. 1.

FIG. 4 illustrates another embodiment of a glass run adapted to prevent occurrence of noises. As shown, a glass run 44 has the construction substantially identical to that of the preceding embodiment.

In the glass run 44, EPDM foam rubber layers 46 and 48 are formed on inside surfaces of side walls 50 and 52 of a main body 54 of an EPDM rubber, which faces the seal lips 56 and 58. These EPDM foam rubber layers 46 and 48 are formed by supplying an EPDM rubber which contains a foaming agent to the inside surfaces of the side walls 50 and 52 during extruding of the glass run 44.

The EPDM foam rubber layers 46 and 48 have rubber-like elasticity, and consequently, noises do not occur even when the vibrating seal lips 56 and 58 strike on the EPDM foam rubber layers 46 and 48. Furthermore, the surfaces of the EPDM foam rubber layers 46 and 48 have minute irregularities, and consequently small spaces are dispersed between such surfaces and seal lips 56 and 58 which have contacted the inside surfaces of the side walls 50 and 52, whereby they do not come into close contact with each other so that noises do not occur when the seal lips 56 and 58 separate from the EPDM foam rubber layers 46 and 48. In the case of the glass run being composed of TPO, foamed layers of TPO are formed on the inside surfaces of the side walls of the main body, similarly.

In accordance with the present invention, since the fine lubricant powder is contained in the main body of a glass run in a dispersed condition, or foamed layers are formed on the inside surfaces of the main body, noises can be prevented from occurring due to the repetition of striking and separating of seal lips on and from the main body when a door glass vibrates upon closing a vehicle door hard or driving a vehicle on rough roads with a door glass half opened. The lubricant may be added to the material for extruding the glass run, and the foamed layers can be formed integrally with the glass run by extrusion. So, the productivity of the glass run is not decreased.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for use in a motor vehicle, wherein the glass run is adapted to be fitted inside a doorframe, the glass run comprising:

a main body having a pair of opposed side wall and forming a generally U-shaped cross section; and a pair of seal lips, which extend obliquely and inwardly from ends of the side walls of the main body, respectively, for holding a periphery of a door glass, wherein each seal lip faces a corresponding one of the side walls, and wherein a fine fatty acid amide lubricant powder is dispersed throughout the side walls such that a content of the fine lubricant powder ranges from 0.2 to 1.0% by weight of a material of the side walls.

2. A glass run for use in a vehicle, the glass run being adapted to be fitted inside a window frame, wherein the glass run comprises a main body having a generally U-shaped cross section, the main body including:

a base and two side walls defining a channel; and two seal lips, each seal lip extending inwardly and towards the base from a corresponding one of the side walls, wherein each seal lip is movable between a central position and a displaced position, the displaced position being adjacent to an inner surface of the corresponding side wall, wherein the two side walls comprise an elastomeric material and a fine fatty acid amide lubricant powder, which is dispersed throughout the side walls, the fine lubricant powder being exposed on the inner surface of each of the side walls to prevent adhesion between the inner surfaces of the side walls and the seal lips in the displaced condition, such that the seal lips in the displaced condition separate quietly from the inner surfaces of corresponding side walls when returning toward their central positions from their displaced positions.

* * * * *